United States Patent
Bebesel et al.

(10) Patent No.: US 7,453,185 B2
(45) Date of Patent: Nov. 18, 2008

(54) PIEZOELECTRIC EXTENSION ACTUATOR

(75) Inventors: Marius Bebesel, Munich (DE); Peter Jaenker, Garching (DE)

(73) Assignee: EADS Deutschland GmbH, Ottobrunn (DE)

( * ) Notice: Subject to any disclaimer, the term of this patent is extended or adjusted under 35 U.S.C. 154(b) by 875 days.

(21) Appl. No.: 10/398,390

(22) PCT Filed: Oct. 2, 2001

(86) PCT No.: PCT/EP01/11360

§ 371 (c)(1), (2), (4) Date: Nov. 7, 2003

(87) PCT Pub. No.: WO02/31378

PCT Pub. Date: Apr. 18, 2002

(65) Prior Publication Data

US 2004/0070311 A1    Apr. 15, 2004

(30) Foreign Application Priority Data

Oct. 5, 2000 (DE) .................... 100 49 176
Aug. 11, 2001 (DE) .................... 101 39 686

(51) Int. Cl.
H01L 41/08 (2006.01)

(52) U.S. Cl. ............... 310/321; 310/328
(58) Field of Classification Search ............. 310/321, 310/328

See application file for complete search history.

(56) References Cited

U.S. PATENT DOCUMENTS

| | | | |
|---|---|---|---|
| 4,849,668 A * | 7/1989 | Crawley et al. ............ 310/328 |
| 5,374,011 A * | 12/1994 | Lazarus et al. ............ 244/99.8 |
| 5,542,230 A | 8/1996 | Schuetze |
| 5,655,878 A * | 8/1997 | Yamakawa et al. ............ 416/31 |
| 5,811,821 A * | 9/1998 | Alexander et al. ....... 250/440.11 |
| 5,913,955 A | 6/1999 | Redmond et al. |
| 5,973,440 A | 10/1999 | Nitzsche et al. |
| 6,154,000 A * | 11/2000 | Rastegar et al. ............ 318/632 |
| 6,172,445 B1 | 1/2001 | Heinz et al. |

(Continued)

FOREIGN PATENT DOCUMENTS

DE    3814829    12/1988

(Continued)

OTHER PUBLICATIONS

International Search Report.

(Continued)

*Primary Examiner*—Mark Budd
(74) *Attorney, Agent, or Firm*—Crowell & Moring LLP

(57) ABSTRACT

A piezoelectric expansion actuator for d33 piezoelements, which allows vibrations in structures to be suppressed. An expansion actuator (1) includes a piezoelectric stack (2), which consists of d33 piezoelectric elements and is arranged between output elements (4), which are attached to the surface of the structure (7). The invention applies to a piezoelectric extension actuator, which is used to control vibrations in structures. Alternatively, in order to damp vibrations between the main gearbox of a helicopter rotor and the cellular structure of the cockpit, a power application point of the output element (18, 19, 180, 190; 35, 36) is arranged at a distance from the corresponding end plate of the piezoelectric stack (22, 220; 31, 32, 33) in the axial direction (X).

12 Claims, 4 Drawing Sheets

U.S. PATENT DOCUMENTS

| | | | |
|---|---|---|---|
| 6,252,334 B1 * | 6/2001 | Nye et al. | 310/328 |
| 6,299,410 B1 * | 10/2001 | Hilbert et al. | 416/145 |
| 6,708,962 B2 * | 3/2004 | Allaei | 267/136 |
| 7,138,747 B1 * | 11/2006 | Smith et al. | 310/317 |

FOREIGN PATENT DOCUMENTS

| | | |
|---|---|---|
| DE | 43 10 825 | 7/1994 |
| DE | 196 31 026 | 2/1998 |
| DE | 196 50 900 A1 | 6/1998 |
| DE | 198 12 748 C1 | 8/1999 |
| DE | 198 13 959 | 9/1999 |
| DE | 199 25 982 | 12/2000 |
| DE | 199 36 732 | 2/2001 |
| DE | 698 05 302 T2 | 11/2002 |
| EP | 0 488 232 | 6/1992 |
| EP | 0 488 232 A1 | 6/1992 |
| EP | 0 926 387 | 6/1999 |
| EP | 0 996 570 B1 | 5/2000 |
| WO | 92/05592 | 4/1992 |
| WO | WO 96/01503 | 1/1996 |

OTHER PUBLICATIONS

English Language Abstract of Japanese Publication No. 63217985.

* cited by examiner

PIEZOELECTRIC EXTENSION ACTUATOR

BACKGROUND AND SUMMARY OF THE INVENTION

This application claims the priority of German Application Nos. 100 49 176.6, filed Oct. 5, 2000 and 101 39 686.4, filed Aug. 11, 2001 and International Application No. PCT/EP01/11360, filed Oct. 2, 2001, the disclosures of which are expressly incorporated by reference herein.

The invention relates to a piezoelectric expansion actuator.

The use of d31 piezoplates or d31 piezosegments is known for the purpose of vibration control and to influence vibrations in structures. d31 piezoplates take advantage of the elastic transverse contraction of the piezoelectric material. Several piezoplates or piezosegments will be described as piezoelectric stacks. A piezoelectric stack consists of several, but at least 2 piezoelements. With the above d31 piezoelements, for example, expansions are introduced into carrier structures for helicopter transmissions so as to suppress the transmission of body sound onto the helicopter cell. In doing so, the d31 piezoelements are integrated in accordance with their expansion direction, which acts parallel to the surface of the d31 elements, into the surface of the carrier structure across a large surface, e.g. through an adhesion technique.

By contrast, the expansion in the familiar d33 piezoelements acts perpendicular to the surface of the elements because d33 piezoplates take advantage of the expansion of the piezoelectric material in the direction of the applied field.

German Patent No. 198 13 959 A1 describes a device for body sound suppression that more effectively reduces the transmission of equipment vibrations and oscillations through a carrier structure onto a cellular structure of a cockpit in a simple construction and at relatively low integration complexity. German Patent 198 13 959 A1 provides that the sound suppression device includes at least one piezoactuator, which introduces the oscillations into the carrier structure in order to block the body sound transmission path onto the insulating structure substantially and to compensate acoustic excitation by use of the existing and excited system dimensions of the sound generator more effectively. This technical idea is not limited to use in helicopter manufacturing. It can be employed in all areas of mechanical engineering where a device for body sound suppression becomes necessary.

Contrary to other familiar expansion actuators, the piezoactuator does not implement the application of power onto the carrier structure at only points, but rather across a relatively large surface of the carrier structure. The carrier structure can be arranged for example between the main gearbox of a rotor and a cellular structure of the cockpit of a helicopter. In this case, the carrier structure would be one or more struts (also called gear struts). The piezoactuator is largely arranged along the entire circumference of the strut and exhibits a defined expansion in the axial direction of the strut. Forces are introduced by the piezoactuator pursuant to German Patent DE 198 13 959 A1 via its surface.

The efficiency of power application is limited by the effective surface of the strut that is to be covered.

The invention is based on the development of a piezoelectric expansion actuator for d33 piezoelements, with which vibrations can be suppressed in structures, and furthermore of considerably increasing the efficiency of power application of a piezoactuator despite the contrary tendency of decreasing construction volume of the piezoactuator.

A solution pursuant to the invention is based on the fact that a d33 piezoelement in the form of a stack is clamped into a mechanical frame, which is fastened to the surface of the structure. Apart from a highly specific, mechanical power, the expansion actuator also achieves good efficiency. Also beneficial is the application of mechanical pre-stress that is integrated in the actuator which allows critical tension strain to be avoided for the piezoelements. Optionally, devices can be integrated in the frame with which stroke speed transformations or stiffness transformations can be beneficially achieved.

In another solution pursuant to the invention, the efficiency of power application for the piezo actuator can be improved by considerably increasing the distance between the resting areas of two output elements of a piezoactuator and a corresponding end plate of the piezoelectric stack in the axial direction towards the strut end. The output elements of the mechanical frame form the power transmission device from the piezoactuator to the strut. The thus considerably enlarged strut distance between the resting areas of the two output elements exhibits less stiffness, consequently leading to an expansion of this strut section with less force required than in a comparable configuration of a piezoactuator where the distance of the resting surfaces of the output elements largely corresponds to the length of the piezoelectric stack. The piezoelement also uses the d33 piezoelectric elements.

BRIEF DESCRIPTION OF THE DRAWINGS

Based on the drawing, exemplary designs of the invention are explained in more detail in the following.

DETAILED DESCRIPTION OF THE PREFERRED EMBODIMENTS

Figure 1:
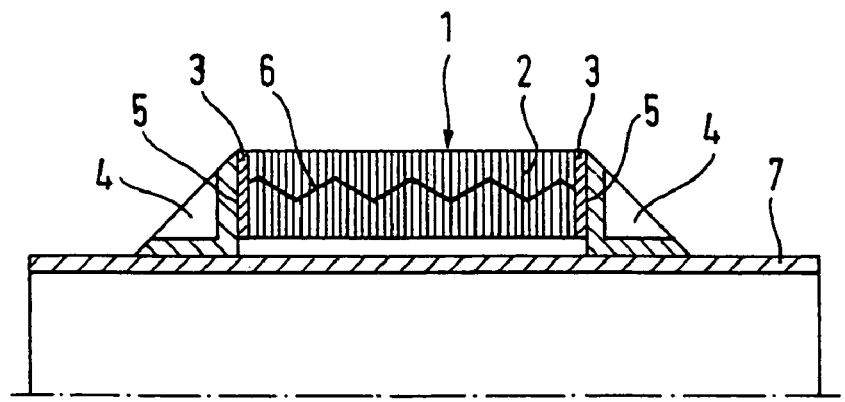
FIG. 1 is a section view of an expansion actuator.

The expansion actuator 1 shown in FIG. 1 is rigidly fastened to the surface of a structure 7 and consists of a d33 piezoelectric stack 2, two end plates 3, two output elements 4 and a prestress element 6.

The d33 piezoelectric stack 2 is arranged in its mechanical frame such that its expansion direction runs parallel to the surface of the structure 6 in which the expansion actuator 1 transmits its piezoelectrically generated expansions. The d33 piezoelectric stack takes up ⅓ of the material volume of a d31 piezoelectric stack for equivalent active expansions.

In the design in FIG. 1 the mechanical frame is formed by the two output elements 4, which are rigidly attached to the structure 6. To accomplish this, the output elements 4 are attached in such a way to the surface of the structure 7 that their output surface 5 is aligned parallel to the respective end plate 3 of the piezoelectric stack 2. The output elements 4 can be fastened to the structure 7 by means of familiar attachment techniques, for example by gluing.

The output elements 4 can be adjusted on their attachment surface to variously bent or plane structural surfaces. In the design shown the structure is a pipe with a circular concave surface. The length of the piezoactuator corresponds to the length of the strut section that is supposed to be expanded.

The piezoelectric stack 2 is seated between its two end plates 3 and held in place with a prestress element 6 at mechanical precompression stress. Possible damaging tensile loads acting upon the expansion actuator 1 are compensated with this precompression stress and can thus have no effect on the piezoelectric stack 2.

The prestress element 6 can be implemented for example with one or more mechanically acting tension springs—as indicated symbolically in the design in FIG. 1. It is also possible, however, to design the end plates 3 as elastic plates and to insert the piezoelectric stack 2 with compressed end plates 3 into the mechanical frame at precompression stress.

Figure 2:
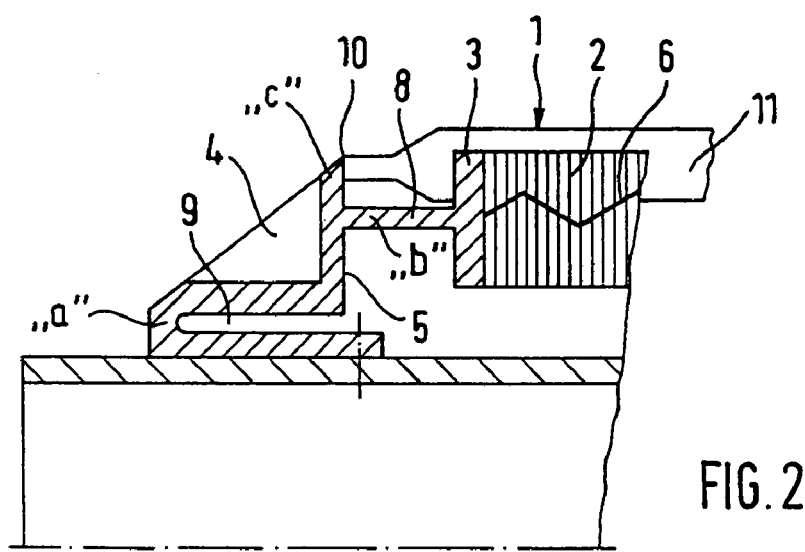
FIG. 2 is an expansion actuator with stroke speed transformation.

The expansion actuator 1 with stroke speed transformation shown in FIG. 2 corresponds to the previously described design except for the following deviations. The end plates 3 of the piezoelectric stack 2 are not connected directly with the output surfaces 5 of the output elements 4, but rather by means of an elastic pressure web 8, and the output elements 4 comprise an inwardly one-sided open slot 9 that runs parallel to the surface of the structure 7. Furthermore, the two output elements 4 are rigidly connected with each other by means of a non-expanding support bar 11, which engages in the free end 10 of the output elements 4. In place of a support bar 11 two parallel support bars 11 that are arranged on either side of the piezoelectric stack 2 can be used, as is revealed in FIG. 2 with a support bar 11 shown in the drawing.

On each output element 4, the elastic pressure webs 8, slots 9 and support bars 11 form three joints "a", "b" and "c" about which the lever sections of the output elements 4 can rotate and generate a stroke speed transformation in the expansion actuator 1.

Figure 3:
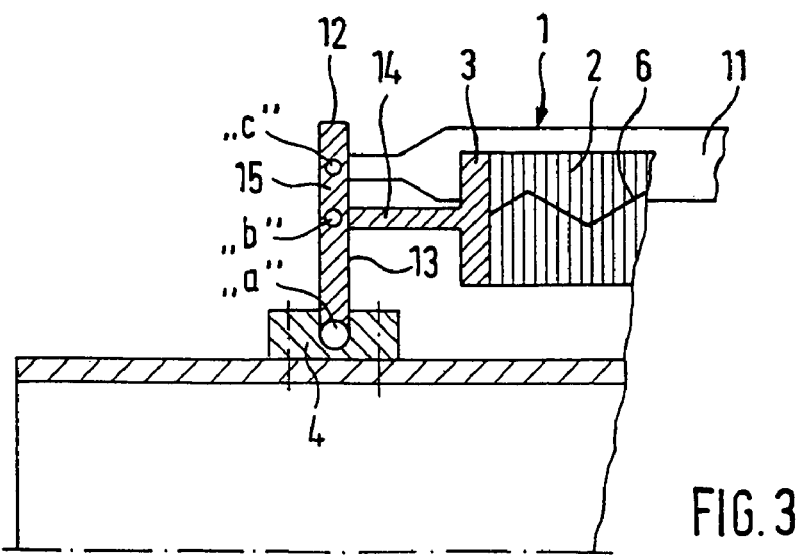
FIG. 3 shows an alternative version of an expansion actuator with stroke speed transformation.

FIG. 3 depicts an expansion actuator 1 with stroke speed transformation in an alternative design version compared to FIG. 2 of the output elements 4 and joints "a", "b" and "c". The effect of lever sections about the joints "a", "b" and "c" in principle corresponds to the previously described design in FIG. 2.

The output elements 4 here are designed with a lever 12 that is seated in joint "a". The joint "b", in which the piezoelectric stack 2 engages with an output web 14, is arranged on the lever 12 with a first lever section 13 at a distance to joint "a".

Joint "c" is arranged on the lever 12 with a second lever section 15 at a distance to joint "b". Joint "c" engages in the support bar 11.

Figure 4:
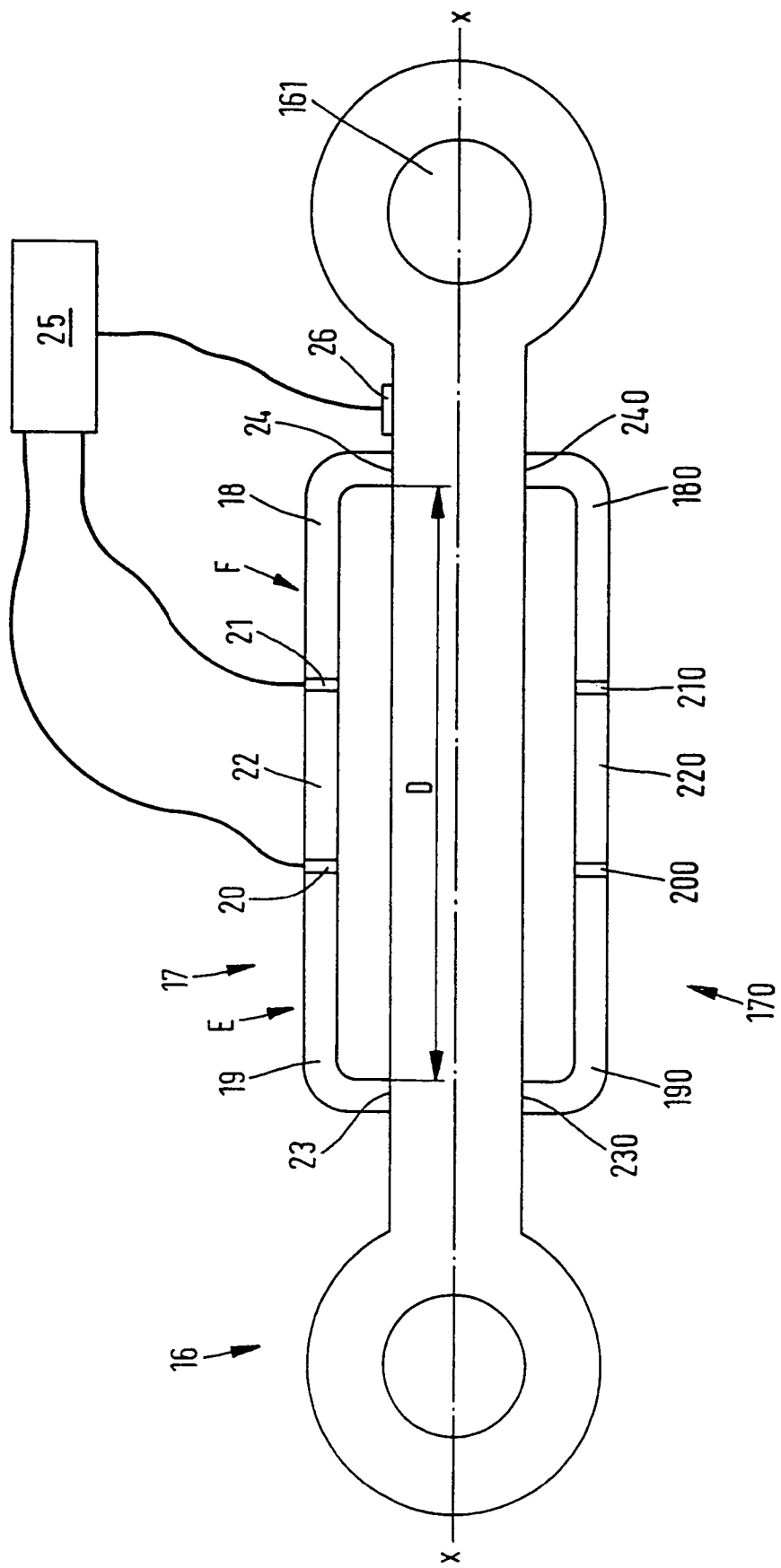
FIG. 4 shows a diagram of a strut with axially spaced output elements of a piezoactuator.

FIG. 4 shows a diagrammatic image of a strut 16. The strut can be, for example, a steel pipe with a fastening loop that is welded onto each end. Such a strut is used, for example, in a quadruple setting in order to connect the main gearbox of the rotor of the helicopter with the cellular structure of the cockpit of the helicopter. The main gearbox is hereby located above the ceiling of the cellular structure of the cockpit. The two components are connected in 4 locations by a strut 16, respectively. The main gearbox of the rotor is one of the main sources of noise generated in the cockpit. Since the strut 16 is seated on the interface between the main gearbox and the cellular structure, it is useful if elastic dimensional changes are generated on the strut, which can largely compensate the forces introduced via the strut. This is effected, for example, through a controlled dimensional change (expansion or contraction) of the strut 16 in the axial direction X. The controlled elastic dimension change is implemented with the piezoactuator 17, which initiates a dimensional change, particularly a change in length in the axial direction X in a certain section D of the strut. In the strut 16 pursuant to FIG. 4 additionally there are two output elements 18, 19 arranged per piezoelectric stack. The output elements 18, 19, however, are not connected directly behind the end plate 20, 21 of the piezoelectric stack 22 with the surface of the strut 16, but the resting surfaces 23, 24 of the output elements 18, 19 are arranged at a distance to the end plate 20, 21 of the piezoelectric stack 22 in the axial direction X. The piezoelectric stack 22 does not have to rest directly on the surface of the strut. The force that is generated by the piezoelectric stack 22 is introduced into the strut 16 on the resting surface 23, 24. This force effects an elastic dimensional change in a section D of the strut 16 between the two resting surfaces 23, 24.

The section D along the strut circumference includes the corresponding sectional spatial structure of the strut. The elastic dimensional change compensates the vibration force in the strut 16, specifically in the area of the interface of strut and cellular structure.

The piezoelectric expansion actuator 17 is formed by d33 piezoelectric elements, which are arranged in a piezoelectric stack 22. The two ends of the piezoelectric stack 22 are limited by the end plates 20, 21. The output elements 18, 19 are arranged on the end plates 20, 21. The power application point of an output element 18, 19 on the strut 16 is arranged at a distance from the end plate 20, 21 in the axial direction X towards the fastening loop 160, 161. Gaining such a distance is associated with gaining a lever arm that engages on both sides of the end plates of the piezoelectric stack. One lever arm E, F each is formed by an output element 18, 19. The lever arms E, F increase the section D by their length since originally section D corresponded only to the length of the piezoelectric stack.

The tensile force, for example, that is generated in a selection of the piezoelectric expansion actuator is introduced into the strut via the output surface of the output element. The section D located between the output surfaces 23, 24 of the strut 16 is thus exposed to a controlled dimensional change in an axial direction X. This change represents an elastic dimensional change. Compared to the previously described solution, this alternative solution takes advantage of the lower rigidity of an enlarged strut section. This increases the efficiency of power application of a piezoactuator 17 considerably. It is, therefore, possible to use a substantially smaller piezoelectric stack without having to accept an efficiency loss.

Multi-axis influencing of the dimensional change of the described section D of the strut 16 can be controlled as a function of the piezoelectric stack's configuration along the circumference of the strut.

The arrangement shown in FIG. 4 can be also designed in the inside of a tubular strut.

As FIG. 4 also shows, this elastic dimensional change of the section D is controlled with a control unit 25. In the area of each output element 18, 19, preferably in the vicinity of the resting surface 23, 24, the control unit comprises a sensor 26, which determines a signal from the quantitative value of the existing vibrational forces and supplies it to the control device. The control device 25 regulates the piezoelectric stack 22 such that a force is generated by the piezoelectric stack and is introduced into the strut 16 via the output elements 18, 19 so as to affect an elastic dimensional change of the strut section D.

The distance D between the resting surfaces 23, 24 can be implemented in a variably adjustable manner by designing at least one lever arm E, F such that it can be enlarged and reduced.

The above explanations apply similarly to the piezoactuator 170 in FIG. 4 with the output elements 180, 190 and the piezoelectric stack 220 with the end plates 200, 210.

Figure 5:
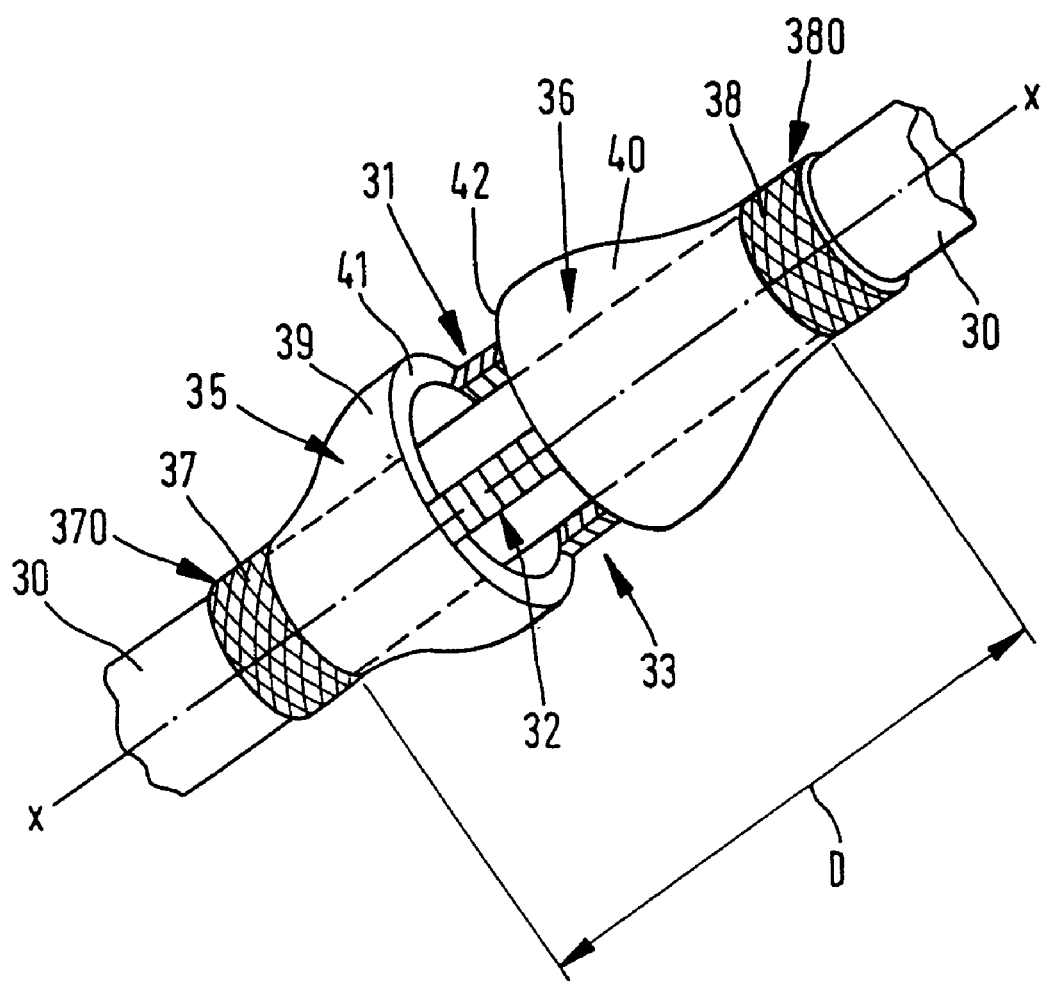
FIG. 5 illustrates a sectional view of a strut with collar-shaped output elements of a piezo actuator.

FIG. 5 shows a sectional view of a design for a strut 30, wherein the two fastening loops on the ends of the strut 30 are not depicted.

FIG. 5 depicts three piezoelectric stacks 31, 32, 33, which form a piezoactuator 34 along with the output elements 35, 36. These piezoelectric stacks 31, 32, 33 are offset from each other, for example, by 120°. Each piezoelectric stack can be arranged at a distance from the surface of the strut. The stacks, however, can also be arranged on the surface of the strut 30. The first version is shown in the example.

The axial axis of the piezoelectric stack is aligned in the direction of the axial axis X of the strut 30. Each piezoelectric stack is arranged between two output elements 35, 36. The two output elements 35, 36 engaging one piezoelectric stack 31, 32, 33, respectively, contain each an annular socket 37, 38, which encloses the strut 30 in an interlocking and non-positive manner along its circumferential surface. Extending from the annular socket 37, 38 the output element 35, 36 opens up in a bell-shaped manner like a collar, which is arranged at a distance from the strut starting from the edge of the annular socket to its annular edge. This shape is described as an annular collar 39, 40. On the edge 41 of the collar 39 rests one end of the piezoelectric stack 31, 32, 33, respectively. The other end of the three piezoelectric stack 31, 32, 33 is respectively located on the edge 42 of the collar 40.

The annular socket 37, 38 of the collar 39, 40 exhibits sufficient rigidity and firmness that corresponds to a resting surface 370, 380 which is connected with the surface of the strut 30 in the circumferential direction in an interlocking and non-positive manner. The forces generated by the piezoelectric stacks 31, 32, 33 are introduced via the resting surfaces 370, 380. Such a design for an output element 35, 36 permits action in a variety of spatial axes. Hence more variable design possibilities exist for introducing power into the strut 30. The forces and bending moments that are introduced into the strut 30 can be used to effect an excursion in the longitudinal (axial) direction, a lateral bending excursion in any random direction and also torsion of the strut 30.

This elastic dimensional change also affects a structural region in the strut 30 along section D.

By using at least two piezoelectric stacks that are arranged around the strut, the strut can be displaced in the longitudinal and lateral directions through appropriate selection of the individual piezoelectric stacks. A suitable control or regulating device is not shown in FIG. 5.

It is also possible to introduce torsional forces by inserting the piezoelectric stack at an angle, i.e. a configuration of at least one piezoelectric stack that is tilted in relation to the longitudinal axis X of the strut 30.

Figure 6:
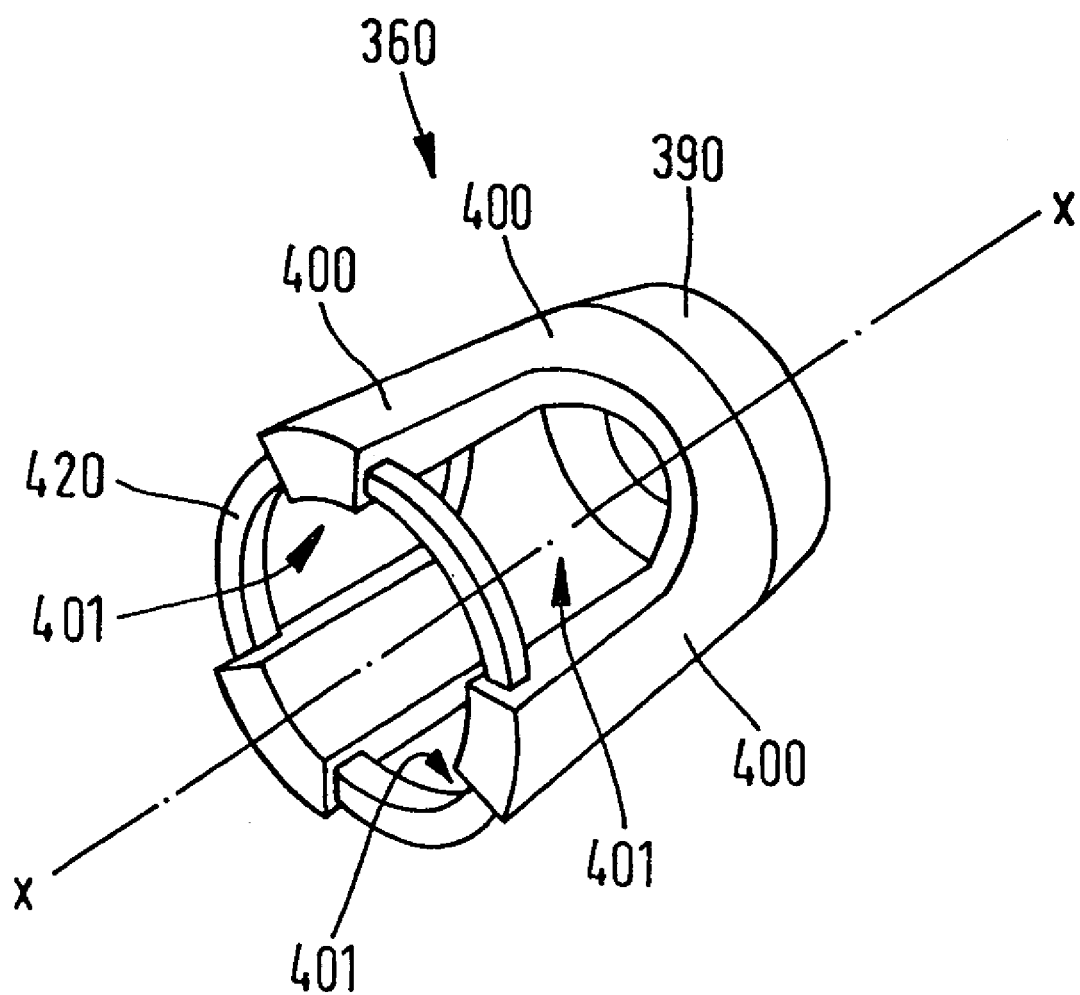
FIG. 6 shows an alternative design of the output element with recesses.

FIG. 6 depicts another possible design of an output element. It is shown as a single output element 360 without strut and without piezoelectric stack. The output element 360 is guided in the direction of the axial axis X of a strut and fastened to the surface of the strut by means of its annular socket 390. A collar 400 is incorporated on the annular socket. This collar 400 contains recesses 401 so that weight of the output element can be saved. The collar 400 includes for example three arms, which can be arranged at an angle of 120° in relation to one another. These three arms of the collar 400 are connected and limited at their ends by a ring 420. This ring 420 forms the edge of the collar 400. One end of a piezoelectric stack is arranged on the edge of the collar, respectively.

Pursuant to another design (not shown), it is also possible to divide an output element 360 partially into sectional output elements. To accomplish this, sectional output elements are arranged in a non-positive manner with each other in one direction along the circumference of a strut in segments and are connected. In the viewing direction of the X-axis, an output element can be divided into individual (wedge-shaped) segments, which are arranged around the X-axis. The output element is thus composed in segments of sectional output elements. The output element pursuant to FIG. 5, for example, could be composed of three sectional output elements in the case of three piezoelectric stacks. This configuration of sectional output elements is an easy option for retrofitting a strut on the helicopter that has already been installed.

Such a configuration makes it possible to reduce the vibrations generated by the main gearbox in relation of the cellular structure of the cockpit efficiently for the pilot and noticeably for the passengers.

The invention claimed is:

1. A piezoelectric expansion actuator for reducing vibrations in a structure, said actuator comprising:
   a pair of output elements attached to a surface of said structure; and
   a piezoelectric stack including a plurality of d33 piezoelectric elements and first and second end plates positioned on respective first and second ends of said piezoelectric stack; wherein,
   surfaces of said output elements which are positioned on said structure are arranged in a longitudinal direction of said structure relative to corresponding ones of said first and second end plates of the piezoelectric stack whereby, when said piezoelectric stack introduces power into said structure, a section of power application becomes larger than a length of the piezoelectric stack in order to effect a stiffness transformation;
   mechanical precompression stress is applied on the piezoelectric stack by means of a prestress element; and
   the prestress element comprises at least one mechanical tension spring.

2. The expansion actuator according to claim 1, wherein the prestress element comprises elastic end plates, which define the extent of the piezoelectric stack that is inserted in the output elements by pressure.

3. The expansion actuator according to claim 1, further including an integrated means for effecting a stroke speed transformation.

4. The expansion actuator according to claim 3 wherein, said means for effecting a stroke speed transformation comprises, in the output elements, an inwardly one-sided open slot that runs parallel to the surface of the structure and an elastic pressure web, respectively, which are arranged between the end plates of the piezoelectric stack and the output surfaces of the output elements.

5. The expansion actuator according to claim 3 wherein;
   said means for effecting a stroke speed transformation comprises, in the output elements, an articulating lever;
   behind a first lever section, the piezoelectric stack with an output web engages the lever in an articulating manner; and
   behind a second lever section the support bar engages the lever in an articulating manner.

6. A piezoelectric expansion actuator for reducing vibrations including at least one piezoactuator arranged on a strut, wherein said strut connects a main gearbox of a helicopter rotor with a cellular structure of a cockpit, each of said piezoactuator actuators comprising a pair of output elements attached to a surface of the strut and at least one piezoelectric stack made of d33 piezoelectric elements positioned between said pair of output elements, wherein resting surfaces of said output elements are arranged on the strut at a distance in relation to respective end plates of said piezoelectric stack in the axial direction whereby when said piezoactuator introduces a control force in one section of the strut for purposes of elastic dimensional change of said section of the strut, an area of section of power application is increased when compared to an area covered by said piezoelectric stack in order to thereby reduce stiffness of the section of the strut.

7. The expansion actuator according to claim 6, wherein the output element forces a lever arm (E, F) extending said output elements configuration on an end plate up to a point of said power application.

8. The expansion actuator according to claim 6, wherein a distance (D) of the resting surfaces of the output elements can be adjusted variably.

9. The expansion actuator according to claim 6, wherein the output elements are designed as collars.

10. The expansion actuator according to claim 9, wherein, between the collar-shaped output elements, the piezoelectric stacks are arranged offset from each other by 120°.

11. The expansion actuator according to claim 9, wherein the collar of the output element contains recesses.

12. The expansion actuator according to claim 6, wherein the output elements are composed of sectional output elements in a circumferential direction of the strut so that retrofitting of an already installed strut is possible.

* * * * *